(12) United States Patent  (10) Patent No.: US 8,924,441 B2
Morris  (45) Date of Patent: Dec. 30, 2014

(54) METHOD OF PERFORMING SNAP IMAGING USING DATA TEMPERATURE FOR MAKING ANTICIPATORY COPIES

(75) Inventor: John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 447 days.

(21) Appl. No.: 11/470,373

(22) Filed: Sep. 6, 2006

(65) Prior Publication Data

US 2007/0055706 A1    Mar. 8, 2007

Related U.S. Application Data

(60) Provisional application No. 60/719,492, filed on Sep. 22, 2005.

(51) Int. Cl.
 *G06F 17/30* (2006.01)

(52) U.S. Cl.
 USPC ........................................................ 707/825

(58) Field of Classification Search
 USPC .................................. 707/E17.143, 757, 825
 See application file for complete search history.

(56) References Cited

U.S. PATENT DOCUMENTS

| | | | |
|---|---|---|---|
| 5,559,984 A * | 9/1996 | Nakano et al. | 711/121 |
| 6,266,742 B1 * | 7/2001 | Challenger et al. | 711/133 |
| 6,633,874 B1 * | 10/2003 | Nusbickel | 707/10 |
| 6,820,085 B2 * | 11/2004 | Nishizawa et al. | 1/1 |
| 7,051,161 B2 * | 5/2006 | Dixit et al. | 711/134 |
| 2003/0120752 A1 * | 6/2003 | Corcoran | 709/219 |
| 2003/0167275 A1 * | 9/2003 | Rjaibi | 707/101 |
| 2006/0259728 A1 * | 11/2006 | Chandrasekaran et al. | 711/170 |

OTHER PUBLICATIONS

Database, Wikipedia, the free encyclopedia, Feb. 27, 2004, pp. 1-3.*
The Authoritative Dictionary of IEEE Standards Terms, 7th Edition, 2000, p. 268.*

* cited by examiner

*Primary Examiner* — Albert Phillips, III
(74) *Attorney, Agent, or Firm* — John D. Cowart; Ramin Mahboubian (57) ABSTRACT

A technique for use in performing snap imaging of a plurality of data objects and associated metadata involves placing the plurality of data objects in a consistent state. While the data objects are in a consistent state, a copy is created of the metadata associated with the plurality of data objects. The data objects are then taken out of the consistent state. The temperature value associated with one or more of the data objects is/are compared with a threshold value. A copy is created of at least some of the data objects for which the associated temperature value exceeds the threshold value.

22 Claims, 8 Drawing Sheets

METHOD OF PERFORMING SNAP IMAGING USING DATA TEMPERATURE FOR MAKING ANTICIPATORY COPIES

CROSS-REFERENCE TO RELATED APPLICATION

This application claims priority from U.S. Provisional Application 60/719,492, filed on Sep. 16, 2005, by John Mark Morris.

BACKGROUND

Computer systems generally include one or more processors interfaced to a temporary data storage device such as a memory device and one or more persistent data storage devices such as disk drives. Data objects are stored on one or more of these disk drives. Groups of data objects will typically represent a table and the table will have associated with it metadata including a table header and the individual addresses of the data objects that belong to that table. In a distributed database the data objects of a table will be stored on different disk drives.

It is often necessary to create a copy of a table or group of data objects. This copy of data objects would be kept separate from the original data and could be modified separately from the original data.

In a traditional system, where a copy of the data objects is required, an entire copy of the table metadata and individual data objects is made. It is generally a requirement that during this copy operation, the original data is not modified. The original data must be placed in a consistent state until such time as an entire copy of the data has been made after which the original data and the copy can be taken out of the consistent state. Methods for ensuring a consistent state include locking the data objects, quiescing applications or taking applications offline. It will be appreciated that write operations to the data are unavailable during a copy operation and in this traditional system where an entire copy of the data is made, this data will have the longest data unavailability or write latency.

One solution to this problem is known as snap imaging of a data object. During a snap imaging operation, physical copies of the data objects are not created. The original data is placed in a consistent state and a copy of only the metadata associated with the original data objects is made instead of actual copies of the data objects. No physical copies of the data objects are created at the time of snap imaging. Once the data is unlocked or taken out of a consistent state, normal read operations and write operations involving the original data or the snap image may occur.

A read operation of the original data does not require any special handling. A read operation of the snap image data is logically directed at the snap image but physically accesses the original data. It will be envisaged that such read operations are only directed at snap image data that has not been the subject of a write operation since the snap imaging operation.

Write operations to an original data object following a snap image operation are delayed while the system performs a "copy on write" operation that physically creates a copy of the data object. It is only after a copy of the data object has been made that the write operation to the original object will then proceed. Further logical read and write operations involving the data object will go to the modified copy of the data object.

In the same way, logical write operations involving the snap image of the object are delayed while the system performs a "copy on write" operation that physically creates a copy of the data object. The write operation to the imaged object will then proceed. Further logical read and write operations to the snap image involving the newly copied data object will go to this modified copy of the data object.

The snap image technique has one benefit over making a traditional copy in that the physical creation of copies of data objects is deferred until such time as the data objects need to be written to for the first time. This means that there is no initial delay while an entire copy of the data objects is made. However there is still a problem with snap imaging in that an application will suffer increased response time whenever a portion of the original data or the image data is written for the first time since the snap operation and the system performs a copy on write operation to instantiate the physical copy of that portion of the image.

SUMMARY

Described below are techniques for performing snap imaging of a plurality of data objects and associated metadata. At least some of the data objects are associated with respective temperature values. The method uses the temperature values associated with the data objects to make anticipatory copies of those data objects.

One technique described below involves placing the plurality of data objects in a consistent state. While the data objects are in a consistent state a copy is created of the metadata associated with the plurality of data objects. The data objects are then taken out of the consistent state. The temperature value associated with one or more of the data objects is/are compared with a threshold value. A copy is created of at least some of the data objects for which the associated temperature value exceeds the threshold value.

In some cases the temperature values with which the data objects are associated are selected from an ordered set of temperature values. The threshold value is also selected from the ordered set of temperature values.

A copy in some cases is created of a predefined percentage of those data objects for which the associated temperature value exceeds the threshold value.

In other cases a copy is created of at least some of the data objects for which the associated temperature value exceeds the threshold value. This copy is made prior to taking the plurality of data objects out of the consistent state.

In another technique the plurality of data objects are placed in a consistent state. While the data objects are in a consistent state a copy is created of the metadata associated with the plurality of data objects, the temperature value associated with one or more of the data objects is compared with a threshold value, and a copy is created of at least some of the data objects for which the associated temperature value exceeds the threshold value. The data objects are then taken out of the consistent state.

DETAILED DESCRIPTION

Figure 1:
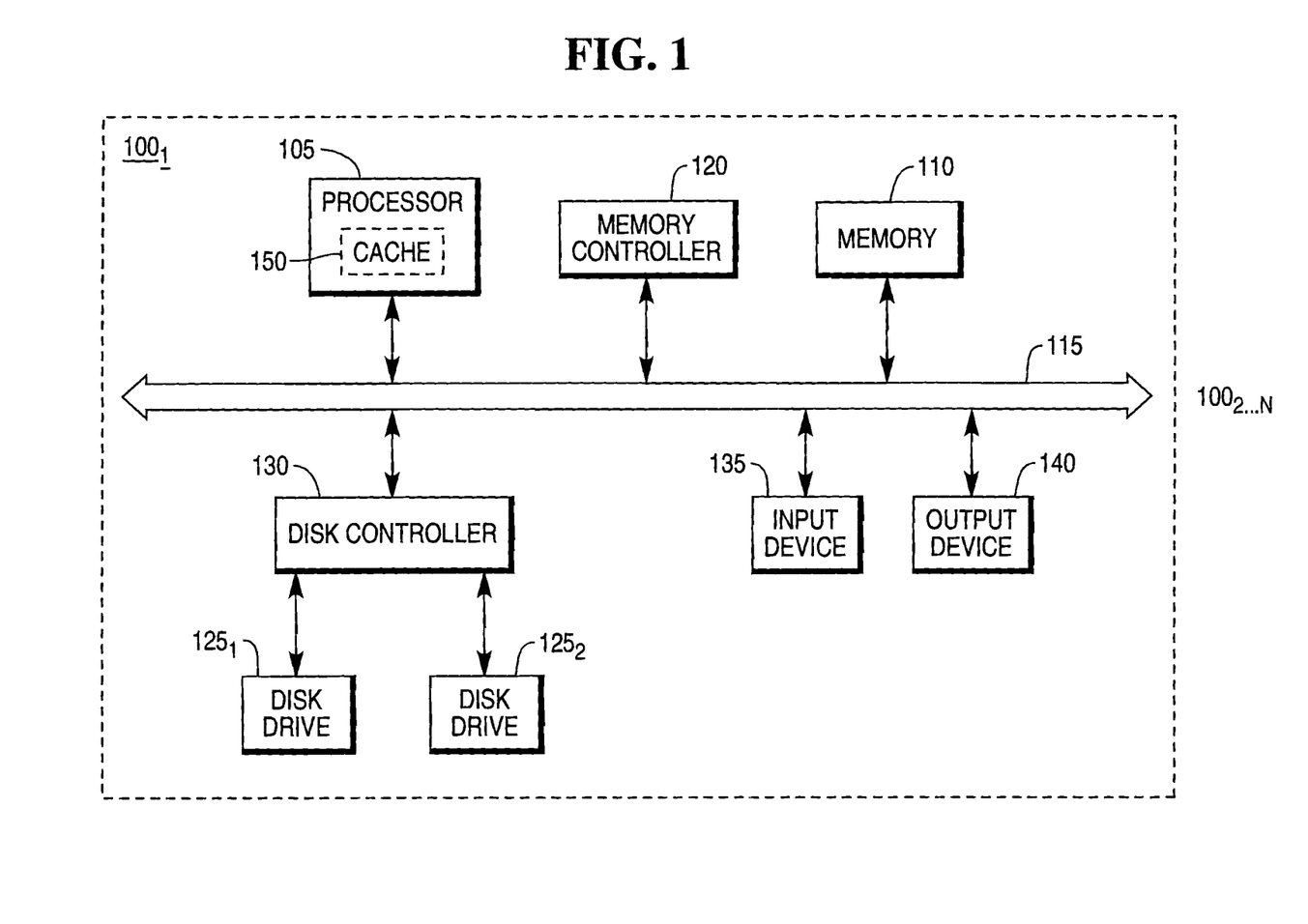
FIG. 1 is a block diagram of a computer system having the capacity to use data temperature for making anticipatory copies.

FIG. 1 shows a computer system $100_1$ suitable for implementation of a method of performing snap imaging of data objects having associated respective temperature values. The system 100 includes one or more processors 105 that receive data and program instructions from a temporary data storage device such as a memory device 110 over a communications bus 115. A memory controller 120 governs the flow of data into and out of the memory device 110. The system 100 also includes one or more persistent data storage devices such as disk drives $125_1$ and $125_2$ that store chunks of data or data objects in a manner prescribed by one or more disk controllers 130. One or more input devices 135, such as a mouse and a keyboard, and output devices 140, such as a monitor and a printer, allow the computer system to interact with a human user and with other computers.

On instructions from the memory controller 120, data objects are retrieved via the disk controller(s) 130 from the disk drives 125. The retrieved data objects are stored in memory 110 for subsequent access by the processor 105. Repeated requests for data from the disk drives can affect the performance of the computer system 100 due to the delay in retrieving data objects from the disk drives. It is common for a user to create a copy of one or more of the data objects in a data cache 150 that typically resides on processor(s) 105, another disk drive and/or memory 110. Further copies of the data are additionally stored on further computer systems $100_2$ ... $N$ interfaced to computer system $100_1$ over the communications bus 115 or other network.

Figure 2:
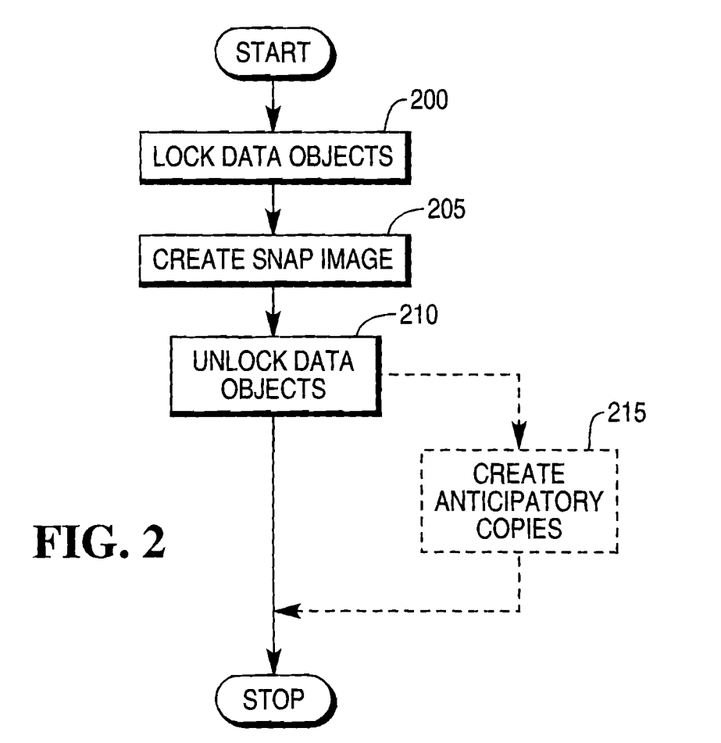
FIG. 2 is a flow chart of a technique for snap imaging using anticipatory copies.

FIG. 2 illustrates one technique of snap imaging in which anticipatory copies of data objects are made. The first step is to lock 200 the data objects. This means that the data objects are placed in a consistent state for example by locking the data objects, quiescing applications or taking applications off line that use the data objects.

While the data objects are in a consistent state a snap image is created 205 from the original data objects. As will be described below the data objects are typically associated with metadata that includes a header and the physical addresses of each data object that is the subject of the snap imaging operation. Only this metadata is initially copied to create the snap image.

Once the snap image has been created, the data objects are unlocked 210 or taken out of the consistent state for example by unlocking the data objects and resuming or restarting the relevant application. Normal reads and writes involving the data can then occur.

The technique also includes the step of creating 215 anticipatory copies of at least some of the data objects. This step of making anticipatory copies is ideally run in the background or as a background process so as to minimize the disruption to normal reads and writes involving the data. The technique uses data temperature statistics to anticipate the particular data objects likely to be updated. Anticipatory copies are made of those data objects likely to be updated.

Some or all of the data objects are associated with a temperature value. The temperature values are selected such that data objects with a relatively high temperature value are likely to be accessed from a storage device, whereas data objects having a relatively low temperature are unlikely to be accessed. A temperature value is an artificial value assigned to a data object to represent the access rate or potential access rate of that data object.

In one form the temperature values are selected from an ordered set of temperature values. In one example the ordered set represents three temperature grades namely HOT, WARM and COOL. In another example the ordered set represents three pacing classes for example SYSTEM PACING, QUERY PACING and NON-PACING. A data object could have associated with it a temperature grade and/or pacing class. The set is preferably ordered so that a temperature of HOT has a higher value assigned to it than the temperature of COOL. It will be appreciated that the terminology for each grade and the number of temperature values in the ordered set could be varied.

As an alternative, the temperature is a numerical value, for example a temperature in Fahrenheit. A temperature of 0° F. is assigned to a data object that is unlikely to be retrieved or accessed from a disk drive whereas a data object that will almost certainly be required to be retrieved or accessed from the disk drive is assigned a temperature value of 200° F. for example.

The temperature of the data object in one technique is initially assigned based on object type. Some data objects such as spool data and indices tend to be accessed more often than other data object types. A series of rules are applied that assign a temperature value to a data object based on data type. Such a system specified temperature value is assigned to a data object so that data objects such as spool data and indices are assigned a relatively hot temperature value whereas other types of data are assigned a relatively low temperature value.

The technique in another form involves obtaining from a human user a user-specified temperature value. For example, using an output device, the user is presented with data representing one or more data objects. Using the input device, the user in one form of the system specifies a temperature value for one or more of these data objects. User-specified temperature values are alternatively or additionally obtained by allowing the user to specify a certain class or type of data object to which a certain temperature value should be assigned.

It is also envisaged that in some systems a data object that already has a temperature value is assigned a new temperature value. For example, the technique assigns to a data object that has recently been retrieved from or written to the disk drives a higher temperature value than that already assigned to it. Similarly, the technique assigns to a data object that has not recently been retrieved from or written to the disk drives a lower temperature value than that already assigned to it. In such a system an automated process calculates a higher or lower temperature to assign to the data object.

In another form every data object is assigned a HOT temperature initially and the temperature of the data object is either raised or lowered depending on the access rate of the data object. In a further alternative the data object inherits the temperature value of other data objects or collections of data with which the data object is stored in the disk drives.

Figure 3:
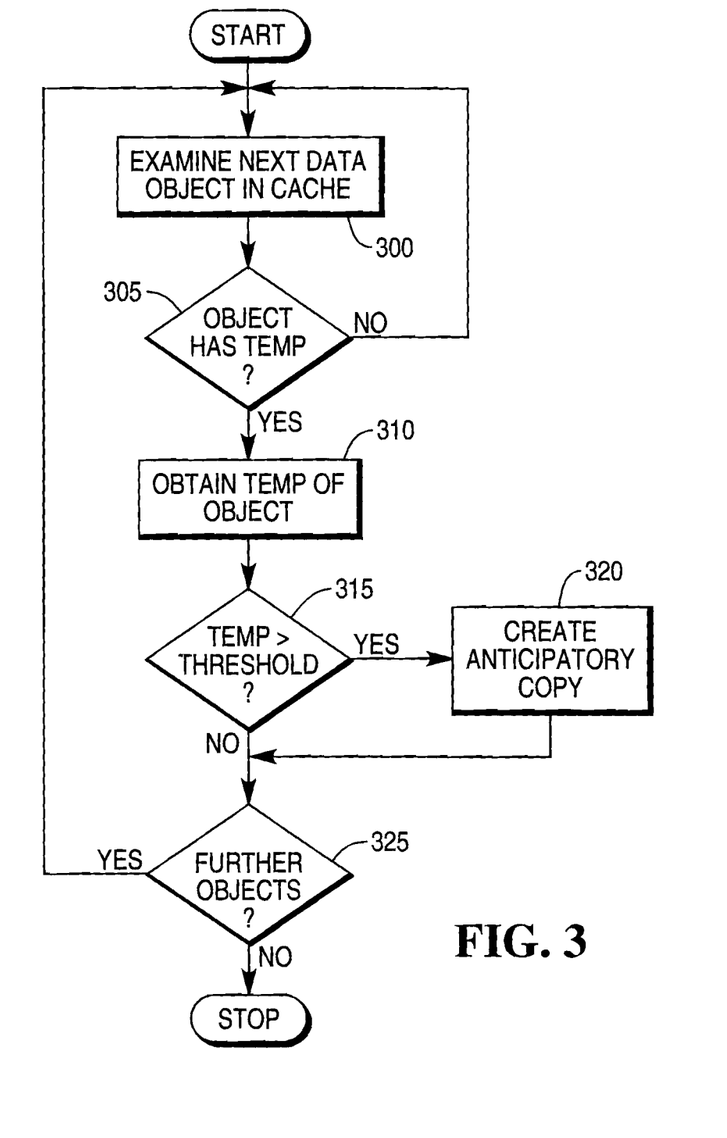
FIG. 3 is a flow chart of a technique for using data temperature statistics to anticipate the data objects likely to be accessed by a user.

FIG. 3 illustrates one technique for using data temperature statistics to anticipate the data objects likely to be accessed by a user. Each data object that is the subject of the snap image operation is examined 300 to determine whether or not the data object has an associated temperature value. If the data object does not have an associated temperature value the next data object is examined. If the data object does have a temperature value 305, the temperature value obtained 310 and compared 315 with a threshold value. Depending on the comparison between the temperature value of the data object and the threshold value, a decision is then made whether or not to create an anticipatory copy of the data object 320. If the temperature value associated with the data object exceeds the threshold an anticipatory copy of the data object is created. The set of data objects is then examined 325 for further data objects.

Figure 4:
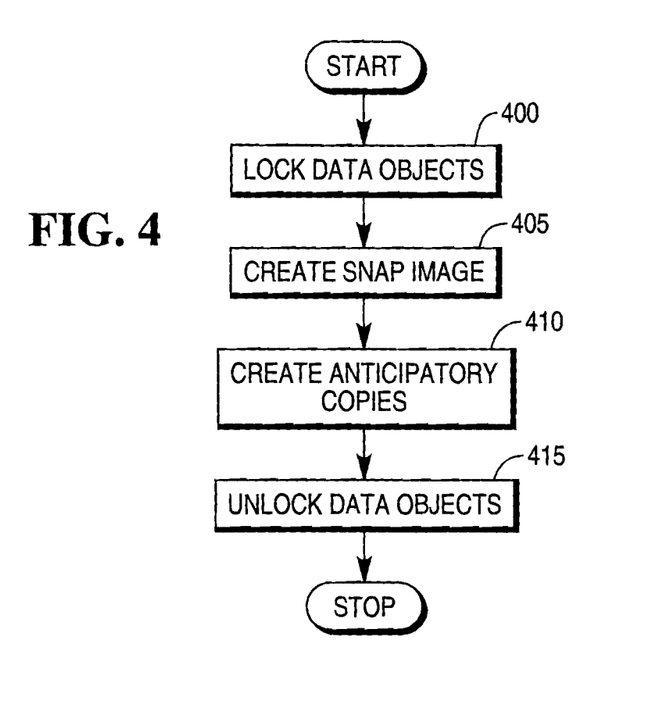
FIG. 4 is an alternative snap imaging technique in which anticipatory copies of data objects are made.

FIG. 4 illustrates an alternative technique to the snap imaging technique of FIG. 2. The data objects are locked 400 and a snap image of the data objects is created 405. The difference in FIG. 4 is that the anticipatory copies of the data objects are created 410 before the data objects are unlocked 415.

If there are few anticipatory copies made of the data objects then making these anticipatory copies during the snap image operation will not affect performance unduly. One benefit of making the anticipatory copies during the snap image process is that the anticipatory copies will be available to all subsequent reads and writes. If instead the anticipatory copies are created by a background process following data unlocking then in some circumstances reads and writes will not have the benefit of the anticipatory copies.

The process for selecting the data objects for making anticipatory copies 410 is performed by a technique such as that described in FIG. 3 involving data temperature statistics.

Figure 5:
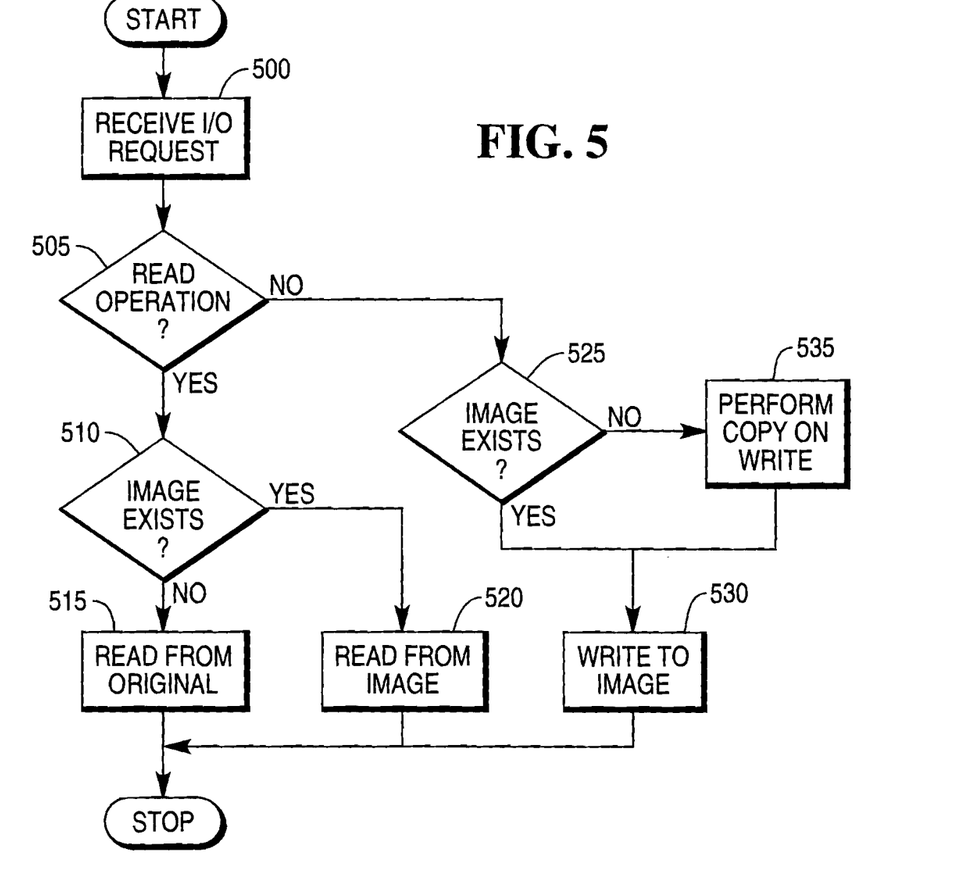
FIG. 5 is a flow chart of a technique for performing I/O requests on data objects for which anticipatory copies have been made.

FIG. 5 illustrates a technique of performing I/O requests on data objects for which anticipatory copies have been made using one of the techniques described above. Upon receiving 500 an I/O request from a requesting device, the system checks 505 to see whether it is a read operation or a write operation.

If a read operation has been received involving data objects, those data objects are checked 510 to identify whether or not anticipatory image data has been created for one or more of these data objects. If no images have been created for a particular data object the read request simply reads 515 the data object from the original copy.

On the other hand, if an image of the data object exists then an anticipatory copy has been made of the image. The read request instead reads 520 the anticipatory copy of the data object rather than the original data object.

If a write operation has been requested involving a data object, the data object is checked 525 to identify whether or not an anticipatory copy of the image exists. If an anticipatory copy exists then the write request is directed to write 530 to the anticipatory copy or image of the data object rather than the original.

If a write request is received and no anticipatory copy of the data object exists then the system performs a "copy on write" operation in which writes to the data object are delayed while a physical image copy of the data object is created 530. The write request is then directed to that recently created image.

By creating anticipatory copies in advance of a write request, the technique seeks to reduce the frequency of performing "copy on write" operations. It is expected that "copy on write" operations will not be entirely eliminated as there will still be some writes to data objects that could not be anticipated. However it is envisaged that the frequency of "copy on write" operations will be reduced.

Figure 6:
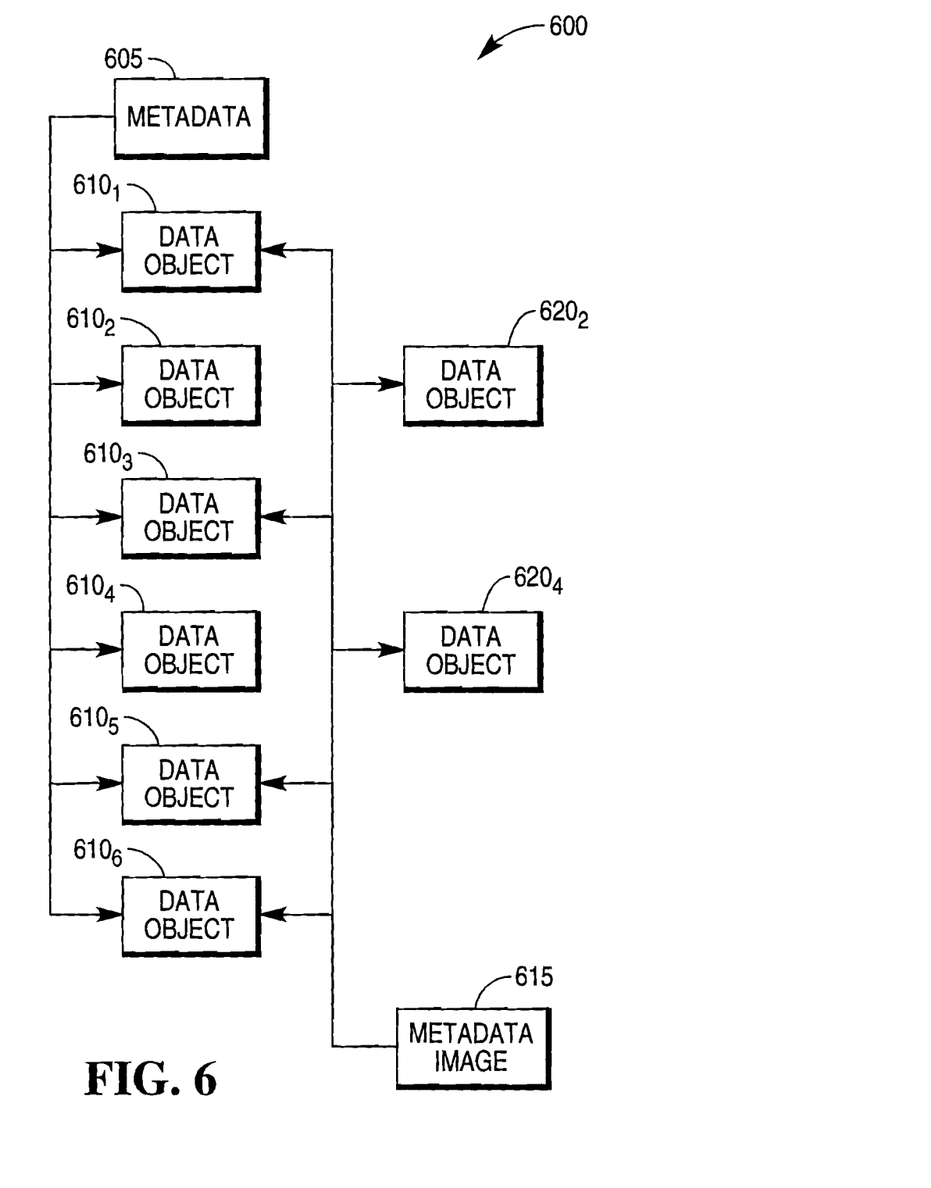
FIG. 6 is a block diagram of a typical set of data objects following a snap imaging operation using anticipatory copy creation.

FIG. 6 shows a typical set of data objects following a snap imaging operation using the anticipatory copy creation techniques described above. The data structure 600 typically includes metadata 605. The metadata includes information such as a data header and individual pointers to data objects $610_{1 \ldots 6}$. Metadata 605 and data objects $610_{1 \ldots 6}$ represent the original data.

Following a snap image operation a snap image 615 is created of the metadata 605. The snap image will initially include pointers to data objects $610_{1 \ldots 6}$.

Anticipatory copies are then made of at least some of the data objects. Shown in FIG. 6 is anticipatory copy $620_2$ representing an anticipatory copy of original data object $610_2$ and anticipatory copy $620_4$ representing an anticipatory copy of original data object $610_4$. The snap image metadata 615 is then updated to include pointers to data objects $610_1$, $620_2$, $610_3$, $620_4$ and $610_5$ and $610_6$.

Figure 7:
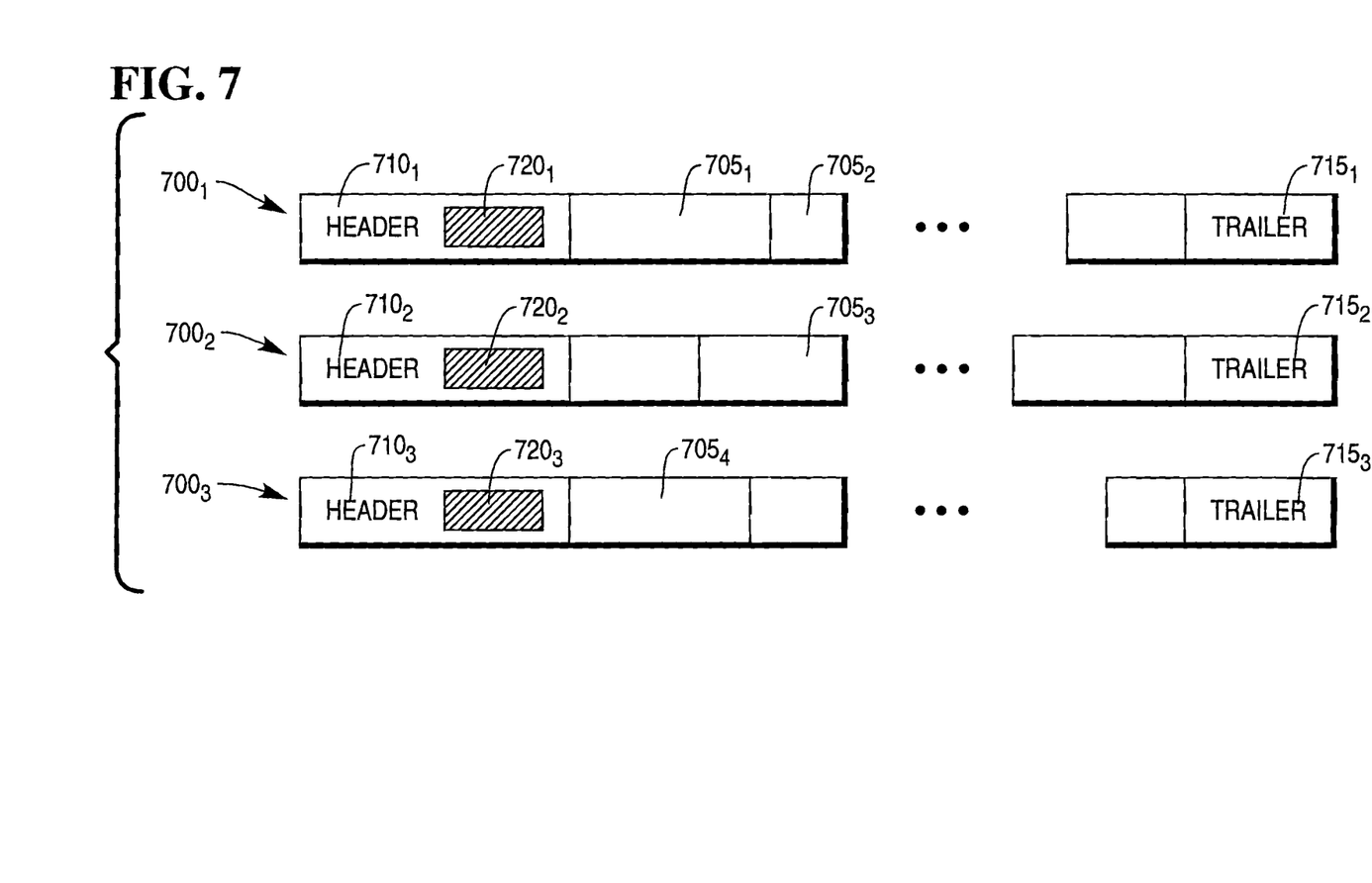
FIG. 7 is a block diagram of data objects having associated temperature values.

FIG. 7 shows several data objects $700_{1 \ldots 3}$ stored on a disk drive. Each of the blocks shown here includes several data segments $705_{1 \ldots 4}$ of equal length. The blocks do not necessarily include an equal number of segments. Each data object 700 includes a header $710_{1 \ldots 3}$ and a trailer $715_{1 \ldots 3}$ marking the beginning and end of each data object respectively. In some systems as shown in FIG. 7 the temperature value $720_{1 \ldots 3}$ of a data object is encoded as a small byte sequence within each header 710. These temperature values in another technique are stored in a map table. In each case at least some of the data objects are associated with respective temperature values.

Figure 8:
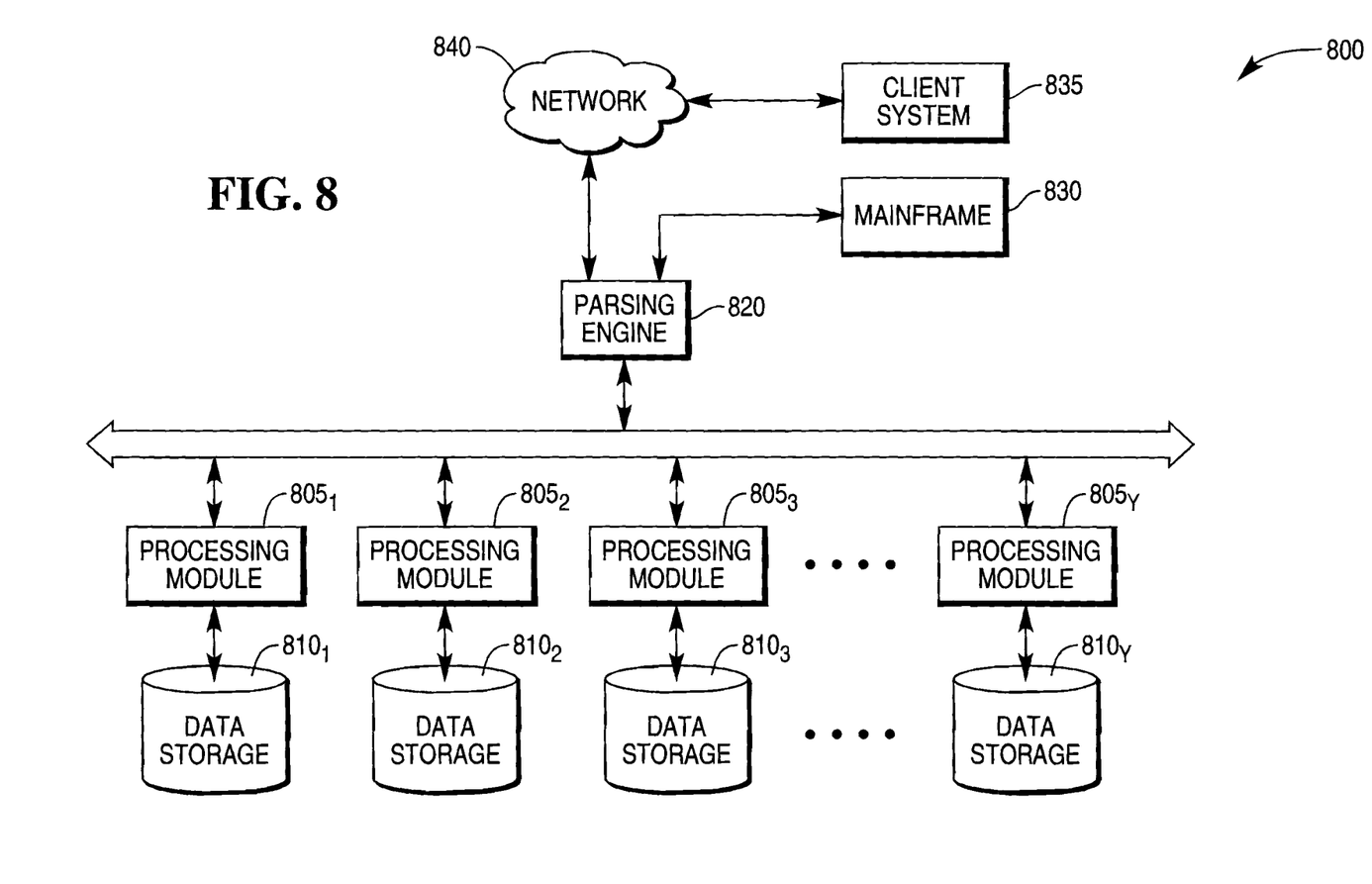
FIG. 8 is a block diagram of an exemplary large computer system in which the techniques described below are implemented.

FIG. 8 shows an example of one type of computer system in which the above techniques of using data temperature to create anticipatory copies is implemented. The computer system is a data warehousing system 800 such as a TERADATA data warehousing system sold by NCR Corporation, in which vast amounts of data are stored on many disk-storage facilities that are managed by many processing units. In this example, the data warehouse 800 includes a relational database management system (RDBMS) built upon a massively parallel processing (MPP) platform. Other types of database systems, such as object-relational database management systems (ORDBMS) or those built on symmetric multi-processing (SMP) platforms are also suited for use here.

As shown here, the data warehouse 800 includes one or more processing modules $805_{1 \ldots Y}$ that manage the storage and retrieval of data and data-storage facilities $810_{1 \ldots Y}$. Each of the processing modules $805_{1 \ldots Y}$ manages a portion of a database that is stored in a corresponding one of the data storage facilities $810_{1 \ldots Y}$. Each of the data storage facilities $810_{1 \ldots Y}$ includes one or more disk drives.

A parsing engine 820 organizes the storage of data and the distribution of data objects stored in the disk drives among the processing modules $805_{1 \ldots Y}$. The parsing engine 820 also co-ordinates the retrieval of data from the data storage facilities $810_{1 \ldots Y}$ in response to queries received from a user at a mainframe 830 or a client computer 835 through a wired or wireless network 840.

The text above describes one or more specific embodiments of a broader invention. The invention also is carried out in a variety of alternative embodiments and thus is not limited to those described here. Those other embodiments are also within the scope of the following claims.

I claim:

1. A method of performing snap imaging of a database table that includes a plurality of data objects and associated metadata indicating a storage location for each of the data objects, where at least some of the data objects are associated with respective temperature values, the method comprising:
creating a snap image of the database table by copying only the metadata associated with the plurality of data objects of the database table, whereby a physical copy of the database table is not created; and thereafter
anticipating subsequent database writes to certain data objects of the plurality of the database objects of the database table by:
  comparing the temperature value associated with one or more of the data objects with a threshold value;
  creating based on the snap image of the database table, an anticipatory copy of at least some of the data objects of the database table for which the associated temperature value exceeds the threshold value, as data objects likely to be updated; and
  not creating an anticipatory copy of at least one of the data objects of the database table for which the associated temperature value does not exceed the threshold value; and
  writing data to the anticipatory copy of the at least one data object in response to a write request to write the data to the database table.

2. The method of claim 1 wherein the temperature values with which the data objects are associated are selected from an ordered set of temperature values.

3. The method of claim 2 wherein the threshold value has been selected from the ordered set of temperature values.

4. The method of claim 3 wherein a copy is created of a predefined percentage of those data objects for which the associated temperature value exceeds the threshold value.

5. The method of claim 1 further comprising:
placing the plurality of data objects in a consistent state prior to the creating of the snap image.

6. A method of performing snap imaging of a database table that includes a plurality of data objects and associated metadata indicating a storage location for each of the data objects, where at least some of the data objects are associated with respective temperature values, the method comprising:
  placing the plurality of data objects in a consistent state;
  creating a copy of the metadata associated with the plurality of data objects, whereby a physical copy of the database table is not created;
  anticipating subsequent database writes to certain data objects of the plurality of the database objects by:
    comparing the temperature value associated with one or more of the data objects with a threshold value;
    creating an anticipatory copy of at least some of the data objects for which the associated temperature value exceeds the threshold value; and
    not creating an anticipatory copy of at least one of the data objects for which the associated temperature value does not exceed the threshold value; and
  taking the plurality of data objects out of the consistent state.

7. The method of claim 6 wherein the temperature values with which the data objects are associated are selected from an ordered set of temperature values.

8. The method of claim 7 wherein the threshold value has been selected from the ordered set of temperature values.

9. The method of claim 8 wherein a copy is created of a predefined percentage of those data objects for which the associated temperature value exceeds the threshold value.

10. The method of claim 6 further comprising the step, after taking the plurality of data objects out of the consistent state, of creating a copy of at least some of the data objects for which the associated temperature value exceeds the threshold value.

11. A database system comprising:
one or more data-storage facilities that store a database table that includes a plurality of data objects and associated metadata indicating a storage location for each of the data objects, where at least some of the data objects are associated with respective temperature values; and
one or more processors configured to manage the one or more data-storage facilities and execute snap imaging of the database table, where, in executing snap imaging, the processors are configured to:
  place the plurality of data objects in a consistent state;
  create a copy of the metadata associated with the plurality of data objects, whereby a physical copy of the database table is not created;
  anticipating subsequent database writes to certain data objects of the plurality of the database objects, prior to receiving the subsequent database writes, at least by:
    comparing the temperature value associated with one or more of the data objects with a threshold value;
    creating an anticipatory copy of at least some of the data objects for which the associated temperature value exceeds the threshold value; and
    not creating an anticipatory copy of at least one of the data objects for which the associated temperature value does not exceed the threshold value.

12. The system of claim 11 wherein the temperature values with which the data objects are associated are selected from an ordered set of temperature values.

13. The system of claim 12 wherein the threshold value has been selected from the ordered set of temperature values.

14. The system of claim 13 wherein a copy is created of a predefined percentage of those data objects for which the associated temperature value exceeds the threshold value.

15. The system of claim 11 further configured to perform the step, prior to taking the plurality of data objects out of the consistent state, of creating a copy of at least some of the data objects for which the associated temperature value exceeds the threshold value.

16. A database system comprising:
one or more data-storage facilities that store a database table that includes a plurality of data objects and associated metadata indicating a storage location for each of the data objects, where at least some of the data objects are associated with respective temperature values; and
one or more processors configured to manage the one or more data-storage facilities and execute snap imaging of the database table; where, in executing snap imaging, the processors are configured to:
  place the plurality of data objects in a consistent state;
  create a copy of the metadata associated with the plurality of data objects, whereby a physical copy of the database table is not created;
  anticipating subsequent database writes to certain data objects of the plurality of the database objects, prior to receiving the subsequent database writes, at least, by:
    comparing the temperature value associated with one or more of the data objects with a threshold value;
    creating an anticipatory copy of at least some of the data objects for which the associated temperature value exceeds the threshold value; and
    not creating an anticipatory copy of at least one of the data objects for which the associated temperature value does not exceed the threshold value; and
  taking the plurality of data objects out of the consistent state.

17. The system of claim 16 wherein the temperature values with which the data objects are associated are selected from an ordered set of temperature values.

18. The system of claim 17 wherein the threshold value has been selected from the ordered set of temperature values.

19. The system of claim 18 wherein a copy is created of a predefined percentage of those data objects for which the associated temperature value exceeds the threshold value.

20. The system of claim 16 further configured to perform the step, after taking the plurality of data objects out of the consistent state, of creating a copy of at least some of the data objects for which the associated temperature value exceeds the threshold value.

21. A computer program stored on one or more tangible storage media comprising executable instructions for performing a method of snap imaging of a database table that includes a plurality of data objects and associated metadata indicating a storage location for each of the data objects, where at least some of the data objects are associated with respective temperature values, the method comprising:

placing the plurality of data objects in a consistent state;

creating a copy of the metadata associated with the plurality of data objects, whereby a physical copy of the database table is not created;

anticipating subsequent database writes to certain data objects of the plurality of the database objects at least by:

comparing the temperature value associated with one or more of the data objects with a threshold value;

creating an anticipatory copy of at least some of the data objects for which the associated temperature value exceeds the threshold value; and not creating an anticipatory copy of at least one of the data objects for which the associated temperature value does not exceed the threshold value.

22. A computer program stored on one or more tangible storage media comprising executable instructions for performing a method of snap imaging of a database table that includes a plurality of data objects and associated metadata indicating a storage location for each of the data objects, where at least some of the data objects are associated with respective temperature values, the method comprising:

placing the plurality of data objects in a consistent state;

creating a copy of the metadata associated with the plurality of data objects, whereby a physical copy of the database table is not created;

anticipating subsequent database writes to certain data objects of the plurality of the database objects, at least by:

comparing the temperature value associated with one or more of the data objects with a threshold value;

creating an anticipatory copy of at least some of the data objects for which the associated temperature value exceeds the threshold value; and not creating an anticipatory copy of at least one of the data objects for which the associated temperature value does not exceed the threshold value; and taking the plurality of data objects out of the consistent state.

* * * * *